US006646253B1

(12) United States Patent
Rohwer et al.

(10) Patent No.: US 6,646,253 B1
(45) Date of Patent: Nov. 11, 2003

(54) GAS INLET FOR AN ION SOURCE

(75) Inventors: Egmont Rohwer, Lynnrodene (CG); Ralf Zimmermann, Munich (DE); Hans Jörg Heger, Munich (DE); Ralf Dorfner, Munich (DE); Ulrich Boesl, Landshut (DE); Antonius Kettrup, Ansberg (DE)

(73) Assignee: GSF-Forschungszentrum für Umwelt und Gesundheit GmbH, Oberschleissheim (DE)

( * ) Notice: Subject to any disclaimer, the term of this patent is extended or adjusted under 35 U.S.C. 154(b) by 188 days.

(21) Appl. No.: 09/718,472

(22) Filed: Nov. 17, 2000

Related U.S. Application Data

(63) Continuation-in-part of application No. PCT/EP99/03420, filed on May 18, 1999.

(30) Foreign Application Priority Data

May 20, 1998 (DE) ........................................ 198 22 674

(51) Int. Cl.[7] ................................................ B01D 59/44
(52) U.S. Cl. ........................................... 250/288; 239/3
(58) Field of Search ................................. 250/282, 283, 250/287, 288; 239/708, 3; 204/299 R

(56) References Cited

U.S. PATENT DOCUMENTS 4,433,241 A 2/1984 Boesl et al.
5,070,240 A 12/1991 Lee et al.
5,788,166 A * 8/1998 Valaskovic et al. ......... 239/708
5,977,541 A * 11/1999 Miyazawa et al. .......... 250/288
6,011,259 A * 1/2000 Whitehouse et al. ....... 250/287
6,032,876 A * 3/2000 Bertsch et al. .............. 239/418
6,207,954 B1 * 3/2001 Andrien et al. ............. 250/288
6,230,572 B1 * 5/2001 Pui et al. ................. 73/863.21
6,348,687 B1 * 2/2002 Brockman et al. .......... 250/251

FOREIGN PATENT DOCUMENTS

EP 0 770 870 5/1997

* cited by examiner

*Primary Examiner*—John R. Lee
*Assistant Examiner*—Phillip A Johnston
(74) *Attorney, Agent, or Firm*—Klaus J. Bach

(57) ABSTRACT

In a gas inlet structure for an ion source, including a capillary for the admission of a sample gas, which capillary is disposed in a guide tube for discharging a sample gas into the guide tube, the guide tube has an open end disposed in the ion source. The guide tube includes a valve for the pulsed admission of a carrier gas to the guide tube. The guide tube, the valve and the capillary are supported in a sealed support housing from which the guide tube with the capillary disposed therein projects into the ion source for supplying thereto the sample gas in a pulsed manner.

5 Claims, 3 Drawing Sheets

GAS INLET FOR AN ION SOURCE

This is a continuation-in-part application of international application PCT/EP99/03420 filed May 18, 1999 and claiming the priority of German application 198 22 674.8 filed May 20, 1998.

BACKGROUND OF THE INVENTION

The invention relates to a gas inlet for an ion source. The gas inlet should introduce the molecules (or atoms) to be ionized into the ion source in such a way that the highest possible ionization efficiency is obtained (that is, that a high sensitivity in the ionization step can be achieved).

It has so far been common practice to introduce the gas to be analyzed into the ion source of the mass spectrometer in an effusive manner. To that end, a supply line (for example, the end of a gas chromatographic capillary) leads to the ion source to which may be of a closed (as for example in many C1- or -E1 ion sources for quadrupole- or sector field mass spectrometers) an open design (for example, many ion sources for travel time mass spectrometers (TOF-mass spectrometers)). In the case of ion sources of closed design, an area of the ion source is flooded by the admitted gas that is the admitted atoms or molecules partially collide with the ion source wall before they can be ionized and detected in the mass spectrometer. The open design of many ion sources for TOF mass spectrometers favors the use of atom- or molecule beam techniques. In that case, a relatively focussed gas beam is directed through the ion source, which gas beam has, in the ideal case, only very little interaction with the building components of the ion source.

For the travel time mass spectrometry effusive molecular beams [2] as well as skimmed [1] and unskimmed [3, 4] supersonic molecular beams are used (in each case, pulsed or continuous (cw)).

Supersonic molecular beam inlet systems permit a cooling of the gas to be analyzed in a vacuum by an adiabatic expansion. It is however a disadvantage that, in conventional systems, the expansion must take place at a relatively large distance from the location of ionization. Since the density of the expanding gas beam (and consequently the ion yield for a given ionization volume) drops exponentially with the distance from the expansion nozzle the achievable sensitivity is limited.

Effusive molecular beam inlet systems do not permit a cooling of the sample. However, gas inlet systems for effusive molecular beams can be so designed, that the gas is discharged directly to the ionization location by way of a metallic needle which extends to the center of the ion source. In that case, a certain electric potential is applied to the needle in order not to disturb the withdrawal fields in the ion source. The needle has to be heated to relatively high temperatures in order to prevent the condensation in the needle of the molecules of low volatility, which are to be analyzed. It is to be taken into consideration in this connection that the coldest point should not be at the needle tip. The required heating of the needle is problematic since the needle needs to be electrically insulated with respect to the rest of the structure (for example, by way of a transition part of ceramic material). Electric insulators are generally also thermal insulators and therefore permit only a very low heat flow from for example the heated supply line to the needle. Heating by electric heating elements or infrared radiation is also difficult since the needle extends between the withdrawal plates of the ion source.

The selectivity of the resonance ionization with lasers (REMPI) depends on the inlet system used (because of the different cooling properties). Besides the effusive molecular beam inlet system (EMB), which can be used among others for the detection of complete classes of substances, it is possible, by the use of a supersonic molecular beam inlet system (jet), to ionize in a highly selective manner and partially even in an isomer selective manner. With the commonly used supersonic nozzles, which were developed for spectroscopic experimentation the utilization of the sample amount (that is, the achievable measuring sensitivity) is not a limiting factor. Furthermore, the existing systems are not designed so as to avoid memory effects. For the use of REMPI-TOFMS spectrometers for analytical applications, the development of an improved jet or beam inlet system is necessary. It has to be taken into consideration however that the valves must consist of inert materials in order to prevent memory effects or chemical decomposition (catalysis) of the sample molecules. Furthermore, the inlet valves should not include any dead volumes. Also, the valves must be able to be heated to more than 200° C. so that also compounds with low volatility of the mass range >250 amu are accessible. Further, as little as possible sensitivity should be lost by the jet arrangement as compared to effusive inlet techniques. This can be achieved mainly by a more effective utilization of the introduced samples in comparison with conventional jet arrangements.

This increase is achieved for example in that each laser pulse reaches the largest possible part of the sample. Under ideal conditions, the sample would be introduced in a pulsed form with each laser pulse so that no sample material is lost between the laser pulses. Furthermore, the injected sample beam should have a spatial extension corresponding to the laser beam. In this way, the complete sample would be used for the analysis without any losses. Then also relatively small sample amounts would produce an adequate signal at the detector. Since the withdrawal volume is predetermined by the dimensions of the laser beam (a widening of the laser beam would reduce the REMPI effective cross-section which scales for example with a two photon ionization with the square of laser intensity) it must be attempted to optimize the spatial as well as the time overlap of the molecular beam and the laser beam. Boesl and Zimmerman et al. [5] present for example a heatable jet valve for analytical applications, for example for the gas chromatography-jet-REMPI-coupling with minimized dead volume. For applications in the area of the ultra-trace analysis or the on-line analysis with REMPI-TOFMS, a further development with respect to the sample utilization (sensitivity), inertness (for example, avoiding metal-sample contact) and heatability (avoiding memory effects) is advisable. Pepich et al. presented a GC supersonic molecular beam-coupling for the laser-induced fluorescence spectroscopy, wherein, with the pulsed admission of the gas, an increase of the duty cycle was achieved in comparison with the effusive admission [6]. In order not to interrupt the GC flow by the pulsed inlet, Pepich has proposed to introduce the sample in an effusive manner into a pre-chamber into which the pulsed carrier gas is injected. In the process, the carrier gas compresses the analysis gas in the pre-chamber and pushes it, like a piston, downwardly through a small opening into the optical chamber where the fluorescence stimulation takes place. As a result of the pulsed compression and injection of the analysis gas into the optical chamber a larger amount of sample molecules can be involved in the subsequent laser excitation. The valve opening and the triggering of the laser must be so synchronized that the laser beam actually hits the area of the compressed analytes in the gas pulse. The arrangement makes also a repetitive, timely limited (<10 $\mu$s), compression of the sample possible without detrimentally affecting the GC-flow. The arrangement of Pepich et al., however, does not permit cooling of the sample gas (this can be achieved only by the installation of mixing structures such as glass wood for example, which detrimentally affects or even destroys the compression characteristics).

It is the object of the present invention to provide a gas inlet for an ion source in such a way that the expansion location of the gas beam can be directly in the ion source of a mass spectrometer in order to achieve a high sensitivity and, with the lowest possible gas loading of the vacuum, the highest possible sample concentration at the ionization location of the ion source of the mass spectrometer.

SUMMARY OF THE INVENTION

In a gas inlet structure for an ion source, including a capillary for the admission of a sample gas, which capillary is disposed in a guide tube for discharging a sample gas into the guide tube, the guide tube has an open end disposed in the ion source. The guide tube includes a valve for the pulsed admission of a carrier gas to the guide tube. The guide tube, the valve and the capillary are supported in a sealed support housing from which the guide tube with the capillary disposed therein projects into the ion source for supplying thereto the sample gas in a pulsed manner.

In comparison with the state of the art, the arrangement has the following advantages:

The supersonic molecular beam expansion can be placed directly into the ion source. In this way, in principle, the highest possible density of the gas beam at the ionization location is achieved. Furthermore, the arrangement permits the compression of the analyte gas in the gas jet pulse, which results in a further increased sensitivity. Particular advantages of the gas admission reside in the fact, that the sample is adiabaticly cooled, the capillary can be heated easily up to its lower end and the sample can be admitted in a pulsed manner.

The arrangement can be such that the sample molecules come in contact only with inert materials.

The injection of the gas should be possible either in a pulsed or in a continuous manner. Furthermore, the analyte gas pulses should be compressed by a driver gas pressure pulse in order to increase the detection sensitivity. By appropriate adjustment of suitable parameters, the gas can be cooled by an adiabatic expansion into the vacuum of the mass spectrometer (supersonic molecule beam or jet). The cooling of the injected gas is advantageous. The lower internal energy of cooled molecules results often in a lower degree of fragmentation in the mass spectrum. Particularly advantageous is the cooling for the application of the resonance ionization by lasers (REMPI). With the use of a so-called supersonic molecule beam inlet system (jet) for the cooling of the gas beam, it is possible to ionize with REMPI in a highly selective manner (partially even isomer-selectively). Since the gas is cooled by expansion, the sample gas admission line, the valve and the expansion nozzle can be heated without a substantial reduction in the cooling properties. This is important for analytical applications. Without sufficient heating, sample components can condense in the admission line or in the gas inlet. Important applications for the invention are the in-coupling of a chromatographic eluent or of a continuous sample gas flow from an on-line sample in a supersonic molecule beam. The inlet system described herein permits the location of the expansion into the ion source of the mass spectrometer. In this way, the ions can be generated directly below the expansion nozzle, which is very advantageous for the achievable detection sensitivity.

The invention will be described below on the basis of the accompanying drawings.

DESCRIPTION OF A PREFERRED EMBODIMENT

Figure 1:
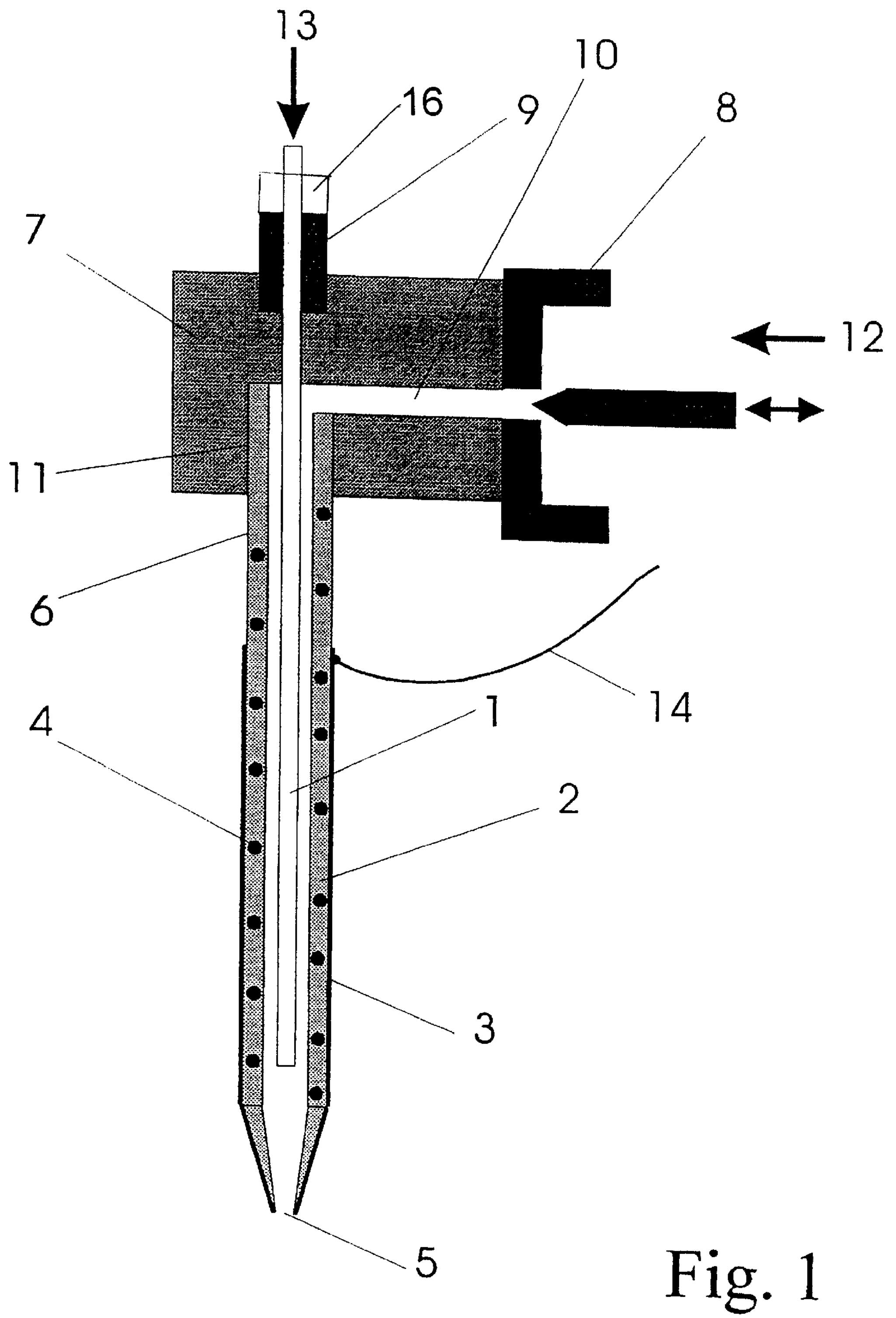
FIG. 1 shows schematically a gas inlet arrangement according to the invention.

The sample gas flow 13 is admitted (for example from the gas chromatograph) by way of a capillary 1 consisting for example of quartz glass. The capillary 1 extends through a support member 7, which consists for example of stainless steel (made inert, Silicosteel®) or of a ceramic material which can be machined, and projects into a tube 2. The support member 7 is disposed in the vacuum space of the mass spectrometer. It can be freely supported (for example, by way of the valve 8 and the gas supply line thereof or by way of the heatable transfer line in which the capillary 1 is disposed). The tube 2 is made so as to be chemically inert at its inner side and may consist for example of glass, quartz or a stainless steel made inert at the inner surface thereof (silanized, Silicosteel®). The capillary 1 is closed with respect to the vacuum of the mass spectrometer by a seal 9 in a gas tight manner. The tube 2 is mounted in the support member 7. Attached to the support member 7 is a pulsed valve 8, by way of which the impulse gas 12 is introduced in the form of pulses into the glass tube by way of the passage 10 extending through the support member 7. The support member 7 can be heated by heating elements (not shown in the drawing). The sample supply line (capillary 1) is disposed in a heated sleeve, which extends up to the support member 7. Also, the tube 2 can be heated. Furthermore, the tip of the tube 2 includes a conductive coating to which a predetermined electrical potential can be applied by way of a contact 14. The heating and the simultaneous applicability of the predetermined potential can be achieved for example as follows:

1) If the tube 2 consists of glass or quartz, micro-heating wires 4 may be melted into the tube walls. On the outside, the tube 2 is provided with a metallic coating 3 (for example, a vapor deposited or sputter-deposited gold layer or a very thin metal sleeve) to which a predetermined electrical potential can be applied by way of the contacting structure 14. The conductive coating 3 is insulated with respect to the support member 7 by providing for example an uncoated area 6 of the glass tube 2 adjacent the support member 7.

Alternatively, a resistance heating structure may be disposed on the outside of the tube 2. Various embodiments of this type may be used. Below, as an example, a particular embodiment of a resistance heating structure is presented: The tube 2 is provided at its outside with a metallic coating (or it consists of metal). In the area to be heated another coating is disposed on the conductive coating the other coating having a relatively high electric resistance, (resistance coating) and is covered by a third (contact) coating. The contact coating is not in direct electrical contact with the lowermost conductive metallic coating. If a voltage is applied between the lower coating and the top coating, the resistance layer acts as a resistance heater. By a suitable selection of the internal resistance (resistance-coating) and of an external resistance (at a given heating capacity), the potential of the outer coating can be so selected as it is needed for the lowest possible influence of the fields on the ion source. A resistance heating structure applied to the outside of the tube 2 can accordingly be used simultaneously for heating and for applying the desired voltage. Another possibility of simultaneously heating and (during the laser pulse) to apply the optimum potential to the outside of the coating is the application of a pulsed heating current. Shortly before each laser pulse, the voltage at the outer coating is adapted to the ideal value.

The end of the tube 2 includes a nozzle opening 5, which may have different designs. The nozzle 5 may be in the form of a Laval nozzle. Also, the tube 2 may become narrower toward the nozzle opening 5. This, for example, cone-shaped narrowing minimizes the influence of the tube 2 extending into the ion source on the electrical withdrawal fields in the ion source. The advantages of the gas inlet system are particularly effective in combination with an advantageous arrangement of the withdrawal diaphragms of the ion source for example of a travel time mass spectrometer. The outlet characteristics of the nozzle 5 during supersonic molecule beam operation is about proportional to $\cos^2 \xi$ wherein $\xi$ corresponds to the angle deviation from the straight line gas beam [7]. For the case of an effusive molecule beam, the directional characteristics are less pronounced. In order to facilitate the removal of the incident gases by pumping and to prevent back stray effects of gas molecules, the ion source should be as open as possible.

Figure 2:
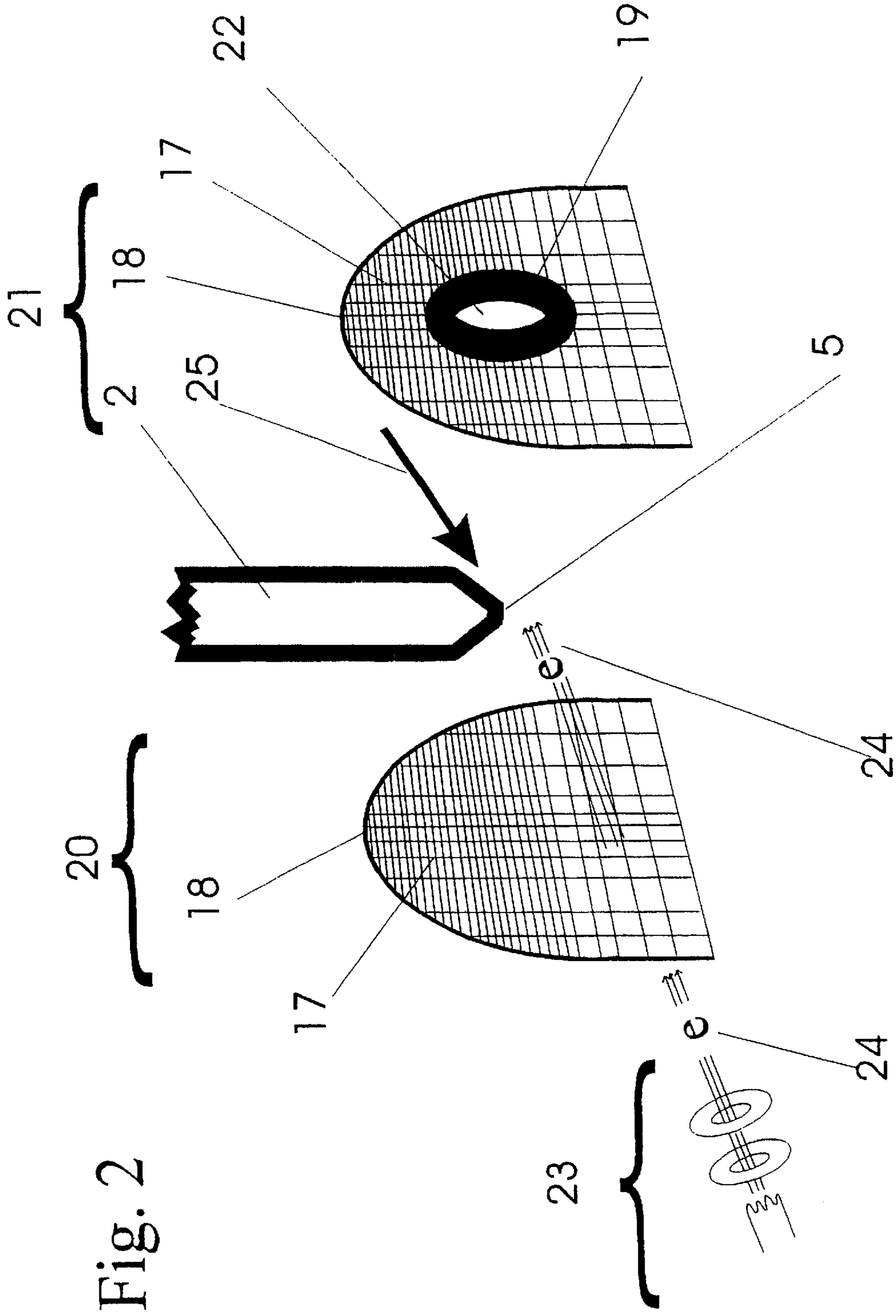
FIG. 2 shows a gas inlet for the ion source of a mass spectrometer.

FIG. 2 shows an advantageous embodiment of an ion source for example for a TOF mass spectrometer and the positioning of the tip for the gas inlet structure according to the invention.

It is advantageous if the repelling diaphragm 20 and the withdrawal diaphragm 21 of the ion source are designed as nets 17 of thin conductive wires. The net can be disposed for example within a wire ring, or a U-shaped or a rectangular support member 18 of thicker wire. In order to achieve the best possible gas permeability without excessively disturbing the electrical withdrawal fields, the density of the net 17 (=number of wires per area unit) may decrease for example from the center of the diaphragm toward the edge. Furthermore, the upper part of the repelling and withdrawal diaphragms 20, 21 may be solid. The ions can be withdrawn either through the net or through a circular or slot-like opening 22. If the net includes an opening 22, the application of a thin annular (or oval, etc.) diaphragm of metal which extends around the opening in the net can improve the ion optical quality (for example, important for the achievable mass resolution). If the repelling diaphragm 20 is in the form of a wire net 17 an electron gun 23 may be provided behind the repelling diaphragm 20 or before the withdrawal diaphragm 21 for the generation of an electron beam for the electron pulse ionization (EI-ionization). The electron gun 23 can be mounted in any desired position behind the diaphragms. Upon installation behind the repelling diaphragm 20, it should be disposed on the axis of the withdrawal direction or off the axis (with installation in front of the diaphragm 21 only off the axis). The electron beam 21 passes through the net 17 of the respective diaphragm 20 or 21 and reaches the sample in the effusive molecule beam under the nozzle 5. It is advantageous that, with an arrangement in a travel time mass spectrometer, the electron impulse ionization occurs alternatingly with REMPI with a laser beam 25, that is, in accordance with the maximum repetition rate of the data receiver and data processor several hundred to thousand EI ionization mass spectra can be recorded per second and parallel therewith, in accordance with the maximum repetition rate of the ionization laser and the maximum repetition rate of the data recording, several ten REMPI mass spectra can be recorded.

The arrangement as described can be operated for example as follows:

If the valve 12 is not operated an effusive molecule beam is formed under the nozzle from the analyte gas beam 13, which is continuously supplied through the capillary 1. For this mode of operation, the capillary 1 can be retracted so for that its tip is just arranged at the passage 10 in the support structure 7. The molecules to be analyzed can be ionized directly under the nozzle 5 for example by a laser (REMPI) or an electron beam (EI). The advantage of the effusive operation in comparison with the conventional effusive gas inlet techniques is for example the direct heatability of the inlet system part extending into the ion source and the use of inert materials.

If, by way of the valve 8, a pulse of the drive gas 12 (for example argon or air with a pulse duration of 750 μs) is injected, a supersonic molecule beam is formed below the nozzle 5. The gas pulse compresses the analyte gas, which has collected in the tube 2, so as to form a spatially concentrated volume. The analyte molecules are present in that volume in a concentrated form (that is, the number of analyte molecules per volume unit is increased). In other words, the analyte gas volume represents an area with increased analyte concentration in the gas jet pulse. This dynamic and transient increased concentration provides for an improved detection sensitivity.

Figure 3:
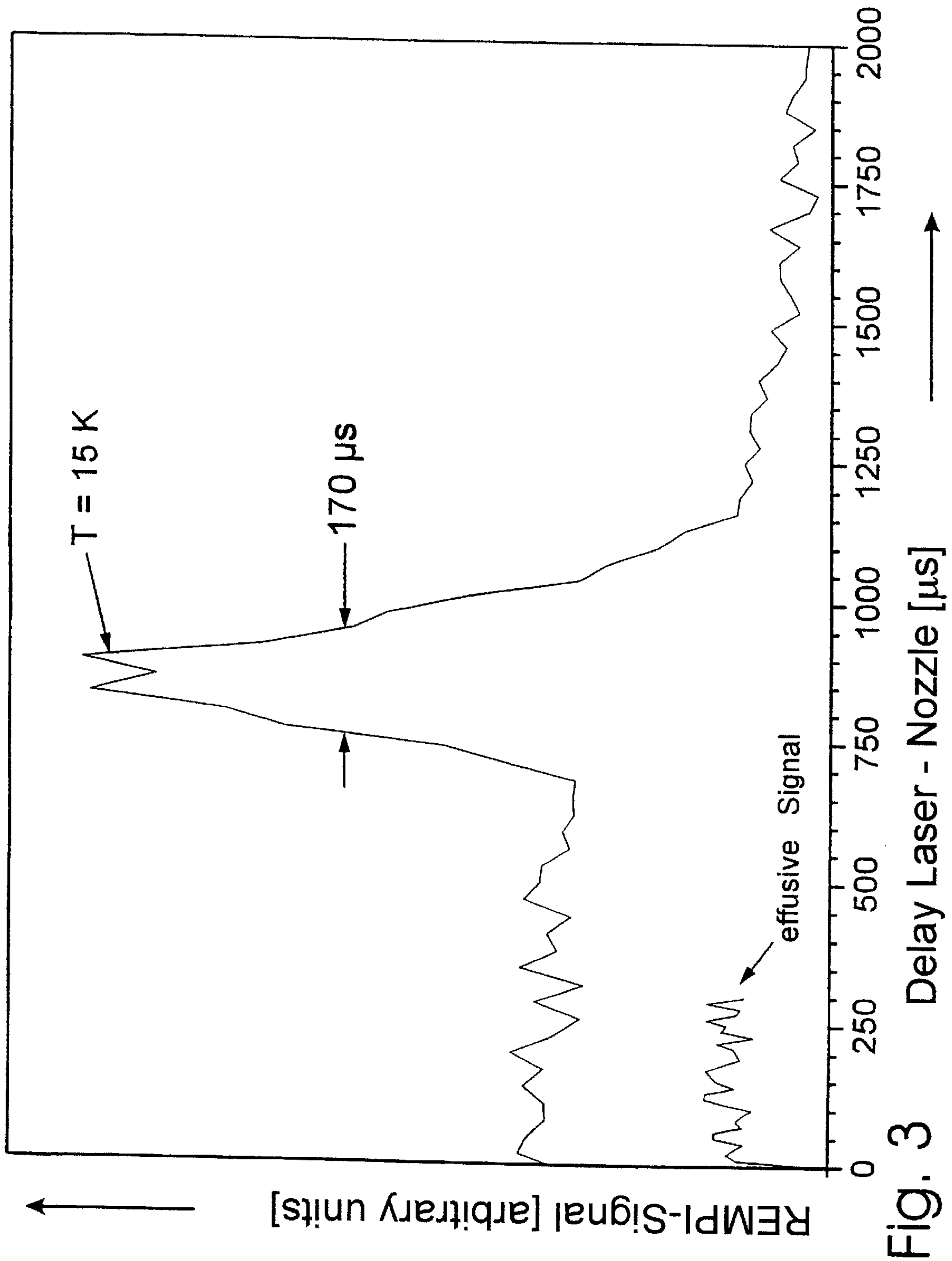
FIG. 3 shows the compression effect achieved with the gas inlet arrangement according to the invention.

FIG. 3 shows the compression effect recorded with a prototype of the inlet system described herein. The delay time between the laser pulse and the trigger pulse for the valve 8 was adjusted in small steps and the REMPI signal of benzene was recorded (benzene was added to the sample gas 13). Although the length of the pulse from the driver gas 12 is greater than 750 μs, the observed width of the analyte gas pulse is only 170 μs (FWHM). The sensitivity with respect to the effusive inlet is noticeably increased. The spectroscopically determined jet cooling is 15° K. This shows that very good supersonic molecule beam conditions are achieved.

Beside the described increased concentration, this mode of operation has further advantages. The analyte gas does not come into contact with inner parts of for example gas valves, but is conducted only in deactivated inert tubes. The compression is achieved by a gas pulse. Also, good beam cooling effects can be reached with the arrangement described. The arrangement also provides for sample guidance as it is necessary for trace-analytical applications (minimized memory effects, exclusion of catalytic reactions). Furthermore, the expansion occurs directly in the ion source of the mass spectrometer. The ionization location can therefore be as close to the nozzle 5 as desired without the need for special ion optical concepts [3] or a drifting of the ions into the source. In practice, a distance of 2–5 mm is reasonable to avoid for example ion-molecule reactions and to achieve complete beam cooling [4]. For spectroscopic purposes for example or as calibration gas, sample gas or calibration gas can be added directly to the driver gas 12.

Alternatively, an arrangement with two valves may be provided. Then the capillary 1 may be replaced by a capillary to which another capillary is connected at one side for supplying the sample gas and to which a pressure pulse can be applied from the top by way of a valve. The valve 8 generates a supersonic molecule beam from the nozzle opening 5 of the tube 2. The sample gas in the capillary can then be compressed by another gas pulse from the additional valve 16 and is pushed out of the capillary and injected into the supersonic molecule beam already formed in the nozzle 5. This supersonic molecule beam caused by the valve 8 represents a so-called sheath gas pulse for the sample gas pulse leaving the capillary. The sample gas is embedded in the sheath gas and expanded through the nozzle 5. The sheath gas principle provides for a further increase of the detection sensitivity and for a local focussing of the sample molecules on the center axis of the supersonic molecule beam.

LITERATURE

[1]
A) R. Tembreull, C. H. Sin, P. Li, H. M. Pang, D. M. Lubman; Anal. Chem. 57 (19985) 1186;
B) R. Zimmermann, U. Boesl, C. Weickhardt, D. Lenoir, K.-W. Schramm, A. Kettrup, E. W. Schlag, Chemosphere 29 1877 (1994) 1877
[2]
A) U. Boesl, H. J. Neusser, E. W. Schlag; U.S. Pat. No. 4,433,241.
B) R. Zimmermann, H. J. Heger, A. Kettrup, U. Boesl, Rapid. Communic. Mass Spektrom. 11 (1997) 1095
[3]
H. Oser, R. Thanner, H.-H. Grotheer, Combust, Sci. And Tech. 116–117 (1996) 567
[4]
R. Zimmermann, H. J. Heger, E. R. Rohwer, E. W. Schlag, A. Kettrup, U. Boesl, Proceedings of the 8th Resonance Ionization Spectroscopy Symposiusm (RIS-96), Penn State College 1996, AIP-Conference Proceeding 388, AIP-Press, Woobury, N.Y. (1997) 119
[5]
A) DE 195 39 589.1
B) EP 0 770 870 A2
[6]
A) B. V. Pepich, J. B. Callis, D. H. Burns, M. Grouterman, D. A. Kalman, Anal. Chem. 58 (1986) 2825;
B) B. V. Pepich. J. B. Callis, J. D. Sh. Danielson, M. Grouterman, Rev. Sci. Instrum. 57 (1986) 878.

What is claimed is:

1. A gas inlet for an ion source, comprising: a capillary for the admission of a sample gas, a guide tube surrounding said capillary and having an open end disposed in said ion source, said capillary having a discharge opening disposed centrally within said guide tube, a pulse valve for the pulsed admission of carrier gas to said guide tube, and a support housing for supporting said capillary said guide tube and said valve in a gas-tight manner, said guide tube with the capillary enclosed therein projecting from said support housing.

2. A gas inlet for an ion source according to claim 1, wherein said guide tube is at least partially coated with an electrically conductive material and provided with a contacting structure for applying an electric potential thereto.

3. A gas inlet for an ion source according to claim 1, wherein said guide tube includes electric heating elements.

4. A gas inlet for an ion source according to claim 1, wherein the open end of said guide tube extending into said ion source includes a flow-constricting nozzle.

5. A gas inlet for an ion source according to claim 1, wherein the discharge opening of said capillary in said guide tube includes a constriction.

* * * * *